United States Patent
Hasebe et al.

(10) Patent No.: US 7,152,877 B2
(45) Date of Patent: *Dec. 26, 2006

(54) AIRBAG AND AIRBAG APPARATUS

(75) Inventors: Masahiro Hasebe, Hikone (JP); Yukitoshi Narimoto, Omihachiman (JP)

(73) Assignee: Takata Corporation, Tokyo (JP)

( * ) Notice: Subject to any disclaimer, the term of this patent is extended or adjusted under 35 U.S.C. 154(b) by 243 days.

This patent is subject to a terminal disclaimer.

(21) Appl. No.: 10/771,390

(22) Filed: Feb. 5, 2004

(65) Prior Publication Data

US 2004/0155440 A1 Aug. 12, 2004

Related U.S. Application Data

(63) Continuation-in-part of application No. 10/671,803, filed on Sep. 29, 2003.

(30) Foreign Application Priority Data

Jan. 24, 2003 (JP) ............... 2003-016298
Nov. 25, 2003 (JP) ............... 2003-394127

(51) Int. Cl.
   *B60R 21/16* (2006.01)
(52) U.S. Cl. .................................. 280/743.1
(58) Field of Classification Search ............ 280/743.1, 280/730.1, 728.2, 731, 732, 743.2
   See application file for complete search history.

(56) References Cited

U.S. PATENT DOCUMENTS

| 3,879,057 | A | * | 4/1975 | Kawashima et al. ..... | 280/743.2 |
|---|---|---|---|---|---|
| 5,125,682 | A | * | 6/1992 | Hensler et al. .......... | 280/730.1 |
| 5,213,361 | A |  | 5/1993 | Satoh et al. |  |
| 5,934,701 | A |  | 8/1999 | Furukawa |  |
| 6,019,390 | A | * | 2/2000 | Keshavaraj ............... | 280/743.1 |
| 6,505,851 | B1 | * | 1/2003 | Frisch ...................... | 280/728.3 |
| 6,536,801 | B1 | * | 3/2003 | Frisch ...................... | 280/743.1 |
| 6,540,254 | B1 | * | 4/2003 | Bieber et al. ............... | 280/732 |
| 6,554,317 | B1 | * | 4/2003 | Lorenz et al. ........... | 280/743.1 |
| 6,588,798 | B1 | * | 7/2003 | Bohn et al. ............... | 280/743.1 |
| 6,595,549 | B1 | * | 7/2003 | Bohn et al. ............... | 280/743.1 |
| 6,598,903 | B1 | * | 7/2003 | Okada et al. ............ | 280/743.2 |
| 6,726,245 | B1 | * | 4/2004 | Fellhauer et al. ........ | 280/743.2 |
| 6,802,534 | B1 |  | 10/2004 | Neupert |  |
| 2002/0084631 | A1 | * | 7/2002 | Lorenz et al. ........... | 280/728.2 |
| 2002/0084638 | A1 | * | 7/2002 | Neupert ................... | 280/743.1 |
| 2002/0084640 | A1 | * | 7/2002 | Bohn ...................... | 280/743.1 |
| 2002/0084641 | A1 | * | 7/2002 | Fellhauer et al. ........ | 280/743.1 |
| 2002/0195809 | A1 | * | 12/2002 | Bieber et al. ............ | 280/743.1 |
| 2003/0218325 | A1 | * | 11/2003 | Hasebe et al. ........... | 280/743.2 |
| 2003/0230883 | A1 | * | 12/2003 | Heym ..................... | 280/743.1 |

(Continued)

FOREIGN PATENT DOCUMENTS

JP        49023176 B      6/1974

(Continued)

*Primary Examiner*—Faye M. Fleming
(74) *Attorney, Agent, or Firm*—Manabu Kanesaka (57) ABSTRACT

An airbag has an inflator at a base side thereof, and the inflator ejects gas to inflate the airbag such that a distal side thereof is deployed in a direction away from the base side. The airbag includes a left half airbag to be deployed on a left side of an occupant and a right half airbag to be deployed on a right side of the occupant. The airbag further includes a constraining member for constraining lateral widths of the left half airbag and the right half airbag when the airbag is deployed. The airbag further includes a connecting member for connecting the left half airbag and the right half airbag at facing portions thereof.

13 Claims, 9 Drawing Sheets

U.S. PATENT DOCUMENTS

2004/0119271 A1 * 6/2004 Webber ...................... 280/731

FOREIGN PATENT DOCUMENTS

| JP | 4-292239 | 10/1992 |
| JP | 06064490 A | * 3/1994 |
| JP | 2003291769 A | * 10/2003 |

* cited by examiner

AIRBAG AND AIRBAG APPARATUS

CROSS REFERENCE TO RELATED APPLICATION

This is a continuation-in-part application of patent application Ser. No. 10/671,803 filed on Sep. 29, 2003.

BACKGROUND OF THE INVENTION AND RELATED ART STATEMENT

The present invention relates to an airbag and an airbag apparatus for protecting an occupant in case of vehicle collision or the like. More specifically, the present invention relates to an airbag and an airbag apparatus having a left half airbag and a right half airbag to be deployed on a left side and a right side of the occupant, respectively.

As an airbag for protecting an occupant in case of vehicle collision or the like, Japanese Patent Publication (KOKAI) No. 04-292239 has disclosed an airbag having a left half airbag and a right half airbag to be deployed on a left side and a right side of the occupant by a common inflator, respectively. In the airbag of the publication, the left half airbag and the right half airbag are connected at distal ends thereof by a tie panel. The airbag is folded and stored in a case, and covered by a cover. When the inflator (gas generator) is actuated to eject gas upon vehicle collision, the airbag is deployed in front of the occupant while pushing and opening the cover.

The inflator is disposed inside or outside of the airbag at a base side thereof. In an airbag apparatus having the inflator disposed outside the airbag, the gas from the inflator is supplied into the airbag through a gas inlet provided in the airbag at the base side. In an airbag having the inflator disposed inside the airbag, the entire inflator may be disposed in the air bag, or a part of the inflator may be disposed in the airbag. As an example of the latter, an airbag includes a pair of slit openings, and a rod-shaped inflator is inserted into the slit openings with both ends thereof projecting out from the airbag.

In the airbag having the left half airbag and the right half airbag disclosed in Japanese Patent Publication No. 04-292239, when the left half airbag and the right half airbag have large capacities in the inflated state, it is necessary to employ an inflator having a large capacity in order to deploy the airbag quickly.

In the airbag disclosed in Japanese Patent Publication No. 04-292239, the left half airbag and the right half airbag are connected at the distal ends by the tie panel. Therefore, when the airbag is deployed, the tie panel receives a lateral center of the body of the occupant.

In the airbag disclosed in Japanese Patent Publication No. 04-292239, when the left half airbag and the right half airbag are deployed, one of the airbags may receive more gas from the inflator, and thus the other airbag may be inflated later than the one of the airbags. In the airbag disclosed in the publication, the left half airbag and the right half airbag are connected by the tie panel. Thus, it is expected that even when one of the airbags is inflated later, the other of the airbags may pull and facilitate the one of the airbags to be deployed via the tie panel in a direction that the airbag deploys. However, the tie panel connects the left half airbag and the right half airbag at the distal ends thereof. Therefore, the one of the airbags can pull the other of the airbags sufficiently via the tie panel only after the one of the airbags is deployed up to the distal end.

It is an object of the present invention to provide an airbag and an airbag apparatus in which a left half airbag and a right half airbag are deployed sufficiently quickly even when an inflator has a relatively small capacity.

It is another object of the present invention to provide an airbag and an airbag apparatus in which the left half airbag receives a left thorax of the occupant, the right half airbag receives a right thorax, and a space between the half airbags faces the center of the thorax of the occupant.

It is a further object of the present invention to provide an airbag and an airbag apparatus in which both of the left half airbag and the right half airbag are deployed smoothly and substantially symmetrically from an early stage of the deployment.

Further objects and advantages of the invention will be apparent from the following description of the invention.

SUMMARY OF THE INVENTION

According to a first embodiment of the present invention, an airbag has an inflator at a base side thereof, and the inflator ejects gas to inflate the airbag such that a distal side thereof is deployed in a direction away from the base side. The airbag includes a left half airbag to be deployed on a left front side of an occupant and a right half airbag to be deployed on a right front side of the occupant. The airbag further includes constraining means for constraining lateral widths of the left half airbag and the right half airbag when the airbag is deployed.

According to a second embodiment of the present invention, in the airbag of the first embodiment, the constraint means extends in a lateral width direction.

According to a third embodiment of the present invention, in the airbag of the first embodiment, the constraint means is connecting means connecting panels of the left and right half airbags.

According to a fourth embodiment of the present invention, in the airbag of any one of the first to third embodiments, a distal end of the left half airbag is not connected to a distal end of the right half airbag. When the airbag is inflated, there is a space between the distal ends of the left and right half airbags.

According to a fifth embodiment of the present invention, in the airbag of any one of the first to fourth embodiments, the left and right half airbags are connected with each other at midsections thereof in a direction that the airbag is inflated.

According to a sixth embodiment of the preset invention, in the airbag of the fifth embodiment, the left and right half airbags are connected with each other at opposite surfaces thereof with a connecting member extending in a direction that the left and right half airbags are connected with each other.

According to a seventh embodiment of the present invention, in the airbag of the sixth embodiment, the constraint means extends in the lateral width direction, and the connecting member and the constraint means are arranged linearly when the airbag is inflated.

According to an eighth embodiment of the present invention, in the airbag of any one of the first to seventh embodiments, vertical width constraint means is provided for constraining a vertical width of each of the left and right half airbags when the airbag is inflated.

According to a ninth embodiment of the present invention, an airbag apparatus includes the airbag of the present invention and an inflator for inflating the airbag.

In the present invention, the airbag and the airbag apparatus include the constraining means for constraining the lateral width thereof when the airbag is deployed. Therefore, even when the inflator has a small capacity, the left half airbag and the right half airbag are deployed sufficiently quickly.

The width constraining means may be a belt extending in the lateral width direction. With this arrangement, through an adjustment of a length of the belt, it is possible to set the widths of the left half airbag and the right half airbag at a desired value in the inflated state.

Alternatively, the width constraining means may be joining means (for example stitching) for joining panels of the left half airbag and the right half airbag with each other. With this arrangement, the left half airbag and the right half airbag have sufficiently small capacities in the inflated state.

In the present invention, the vertical width or height of the airbag may be constrained in addition to the lateral width described above when the airbag is deployed. With this arrangement, the left half and the right half airbags can be deployed further quickly.

In the present invention, the distal ends of the left half airbag and the right half airbag are not connected with each other, and the space opening toward the occupant is formed between the distal ends of the left half airbag and the right half airbag when the airbag is deployed.

When the airbag is deployed, the left half airbag receives the left thorax of the occupant, and the right half airbag receives the right thorax of the occupant. The left and right thoraxes include hard strong rib bones. The airbag receives and absorbs an impact of the occupant through the rib bones. The airbag includes the space between the distal ends of the left half airbag and the right half airbag in the deployed state, so that the space faces a central portion of the thorax of the occupant near breastbones. Therefore, when the occupant hits the airbag, the portion around the breastbones of the thorax does not receive a strong force from the airbag, and thus a load exerted to the portion around the breastbones is reduced.

According to the present invention, a distance between the distal ends of the left half airbag and the right half airbag is set to be 150–350 mm when the airbag is deployed. As a result, the left half airbag faces a portion around a center of the left thorax, and the right half airbag faces a portion around a center of the right thorax. Accordingly, the airbag reliably receives the portion around the rib bones of the upper body of the occupant.

In the present invention, a common inflator may be provided for inflating the left half airbag and the right half airbag. With this arrangement, it is possible to reduce the number of the inflators, thereby reducing a manufacturing cost.

According to the present invention, the left half airbag and the right half airbag may be connected with each other at the midsections thereof in a direction that the airbag deploys. When the half airbags are connected at the midsections, even if one of the airbags is deployed later, the other of the airbags pulls the one of the airbags to facilitate the deployment. The left half airbag and the right half airbag are connected at the midsections in the direction of deployment. Accordingly, the other of the airbags starts to pull the one of the airbags from an early stage when the other of the airbags is deployed up to the midsection. Therefore, both of the left half airbag and the right half airbag are deployed smoothly and substantially symmetrically from the early stage of deployment.

In the airbag in which the left half airbag and the right half airbag are connected with each other at the midsections thereof in the deployment direction, the left and right half airbags may be connected with each other at the opposite surfaces thereof with the connecting member extending in the direction that the left and right half airbags are connected with each other. Accordingly, the connecting member restricts a distance between the left half airbag and the right half airbag according to a length of the connecting member.

In this case, the constraint means extends in the lateral width direction. When the airbag is inflated, the connecting member and the constraint means are arranged linearly. Accordingly, the left half airbag and the right half airbag become stable when the airbag is inflated.

BRIEF DESCRIPTION OF THE DRAWINGS

FIGS. 1(a) and 1(b) are views of an airbag according to an embodiment of the present invention, wherein

FIGS. 4(a) and 4(b) are views of the airbag shown in FIG. 1(a), wherein

FIGS. 7(a) and 7(b) are views of an airbag according to a still further embodiment, wherein

FIGS. 8(a) and 8(b) are views of an airbag according to a still further embodiment, wherein

FIGS. 9(a) and 9(b) are views of an airbag according to a still further embodiment, wherein

DETAILED DESCRIPTION OF PREFERRED EMBODIMENTS

Figure 1A:
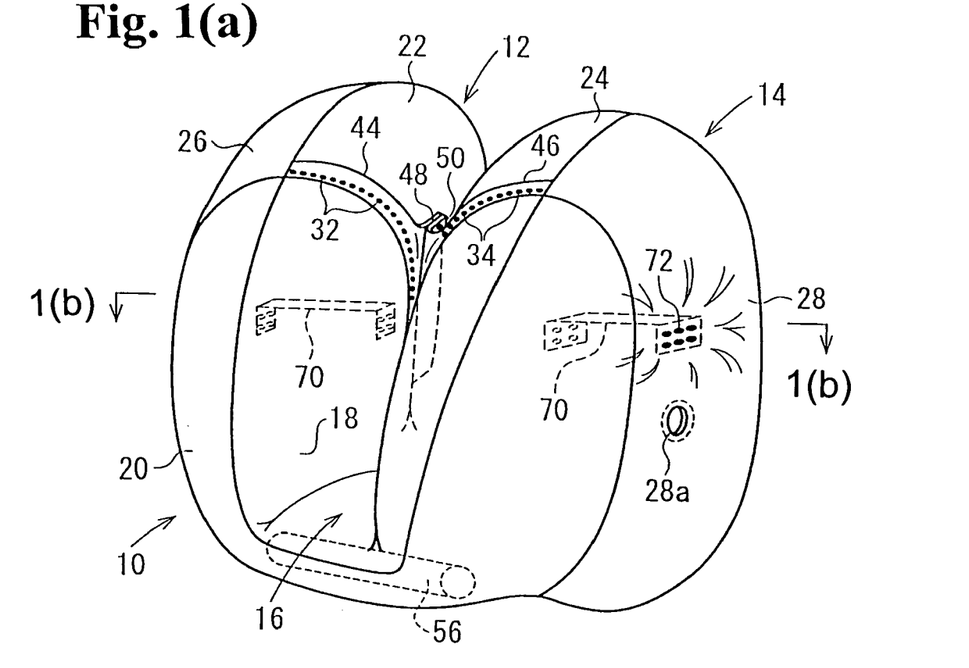
FIG. 1(a) is a perspective view of the airbag in a deployed state.
Figure 1B:
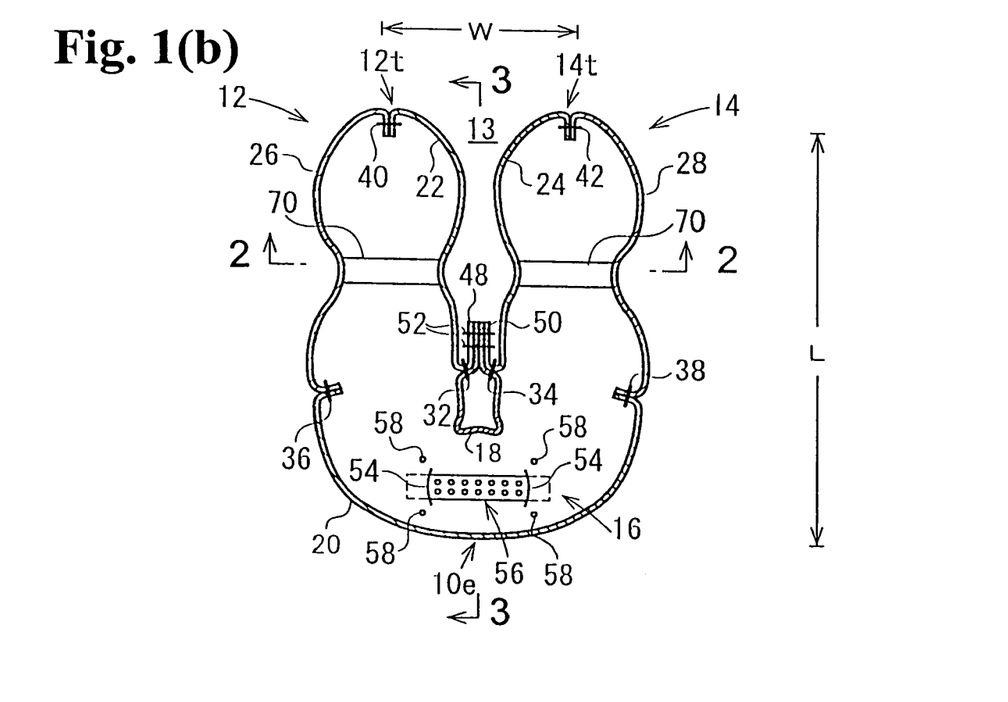
FIG. 1(b) is a cross sectional view taken along line 1(b)–1(b) in FIG. 1(a)
Figure 2:
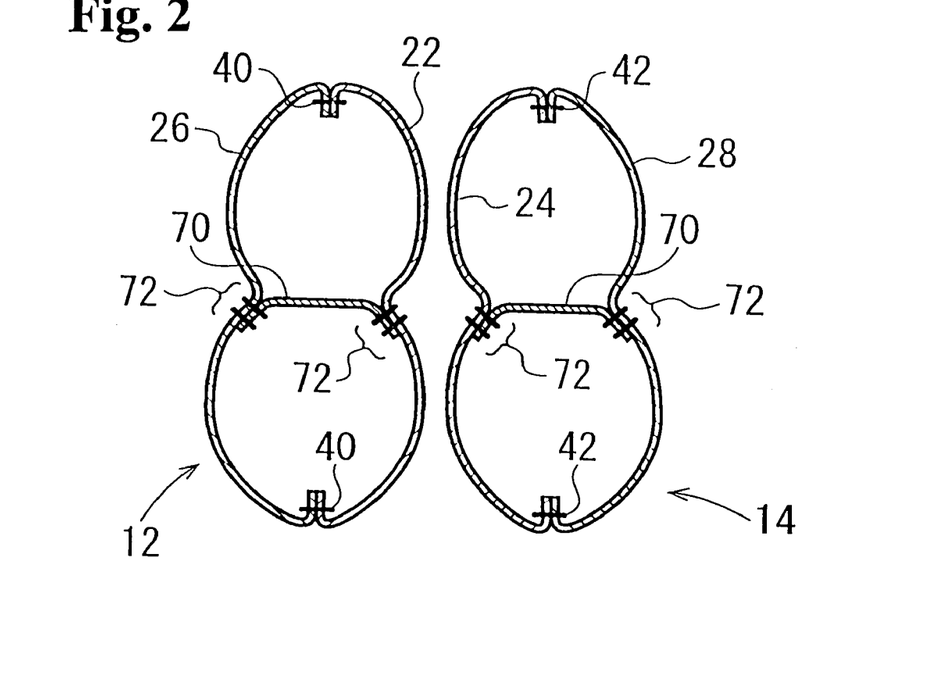
FIG. 2 is a cross sectional view of the airbag taken along line 2—2 in FIG. 1(b)
Figure 3:
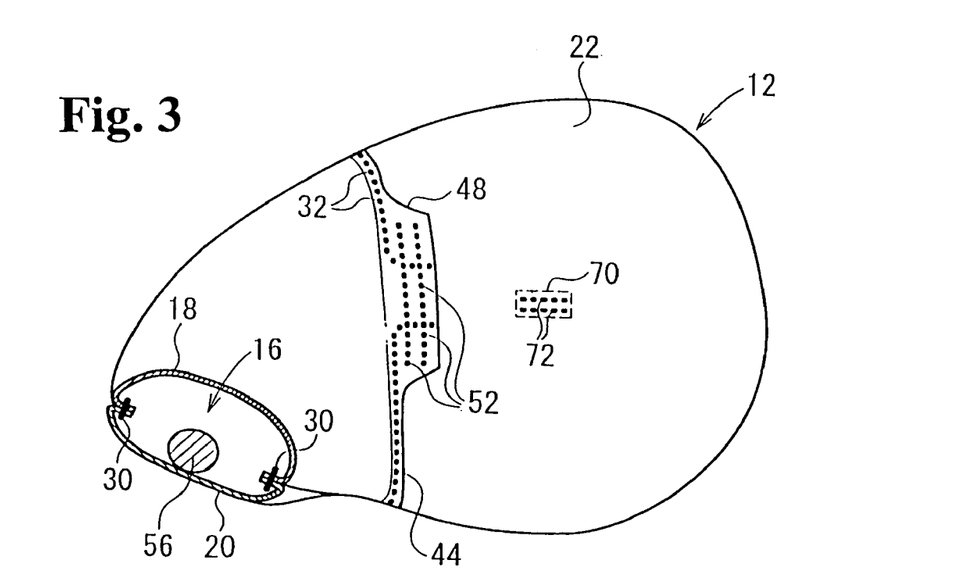
FIG. 3 is a cross sectional view of the airbag taken along line 3—3 in FIG. 1(b)
Figure 4A:
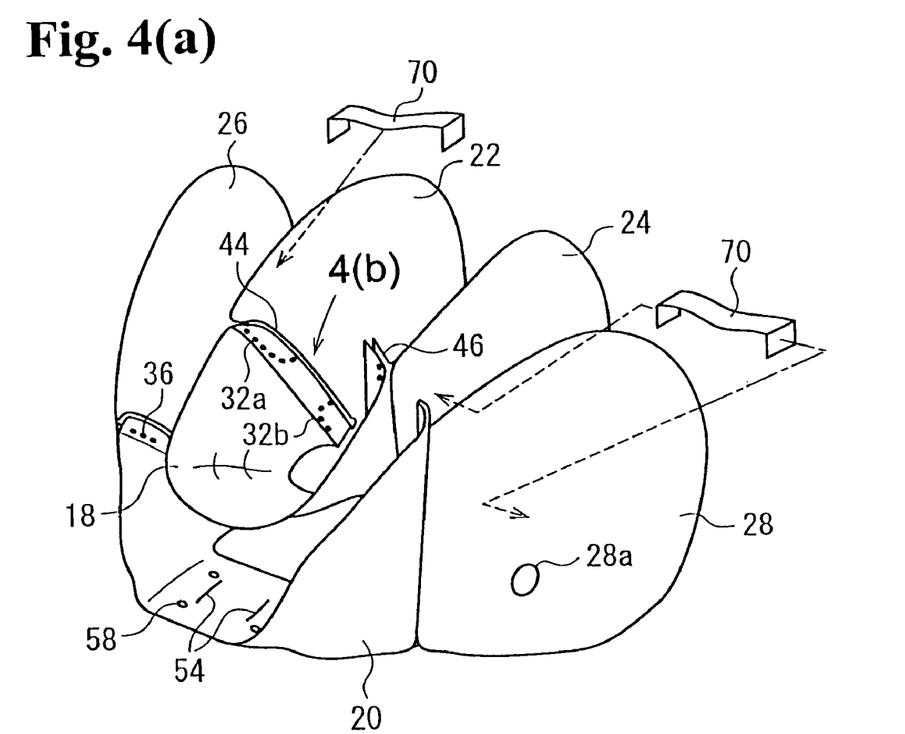
FIG. 4(a) is an exploded perspective view of the airbag.
Figure 4B:
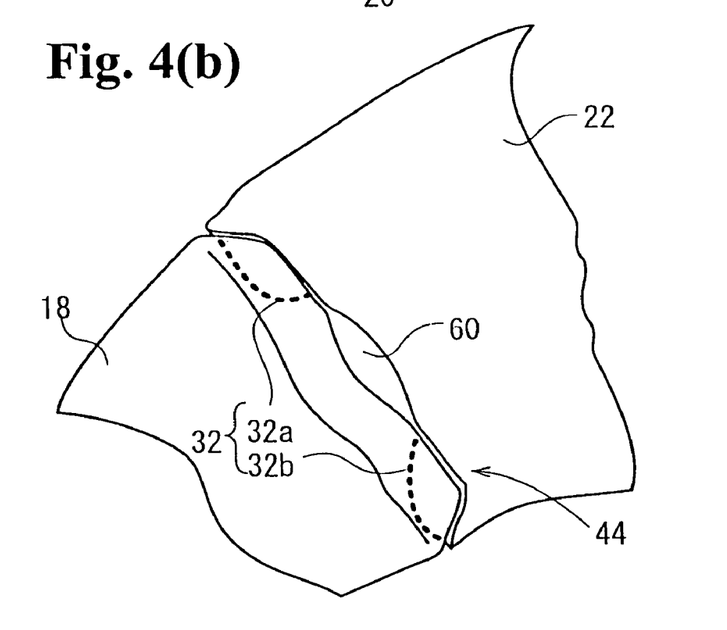
FIG. 4(b) is an enlarged view of a portion 4(b) in FIG. 4(a)

Hereunder, embodiments of the present invention will be described with reference to the accompanying drawings. FIG. 1(a) is a perspective view of an airbag according to an embodiment of the present invention in a deployed state, and FIG. 1(b) is a cross sectional view taken along line 1(b)—1(b) in FIG. 1(a). FIG. 2 is a cross sectional view of the airbag taken along line 2—2 in FIG. 1(b). FIG. 3 is a cross sectional view of the airbag taken along line 3—3 in FIG. 1(b). FIG. 4(a) is an exploded perspective view of the airbag, and FIG. 4(b) is an enlarged view showing a portion 4(b) in FIG. 4(a).

An airbag 10 includes a right half airbag 12 to be deployed on a right front side of an occupant, a left half airbag 14 to be deployed on a left front side of the occupant, and a communicating portion 16 for communicating end portions of the right half airbag 12 and the left half airbag 14 with each other. The communication portion 16 corresponds to a base side of the airbag 10. The right half airbag 12 and the left half airbag 14 are deployed in a direction away from the communicating portion 16, respectively.

The right half airbag 12 and the left half airbag 14 are provided with connecting belts, or connecting strings, 70 as width constraining means for constraining lateral widths of the half airbags when the airbag is deployed. The connecting belts 70 are disposed inside the right half airbag 12 and the left half airbag 14, and connect front inner panels 22, 24 and front outer panels 26, 28 constituting right and left side surfaces of the right half airbag 12 and the left half airbag 14, respectively. The connecting belts 70 are joined to the respective panels 22–28 at both ends thereof by seams 72.

When the right half airbag 12 and the left half airbag 14 are deployed, the connecting belts 70 prevent the right and left side surfaces of the right half airbag 12 and the left half airbag 14 from moving away from each other more than lengths of the connecting belts 70. Accordingly, the lateral widths of the right half airbag 12 and the left half airbag 14 are constrained, when the airbag is deployed.

When the airbag 10 is deployed, a bridging member such as a tie panel does not exist between distal ends of the right half airbag 12 and the left half airbag 14, and a space 13 is formed between the distal ends of both bags 12, 14 to face the occupant (upward in FIG. 1(*b*)).

When the airbag 10 is completely deployed, a distance W between an extremity 12*t* of the right half airbag 12 and an extremity 14*t* of the left half airbag 14 is preferably 150 to 350 mm, and more preferably, 170 to 330 mm. In the airbag 10, the right half airbag 12 and the left half airbag 14 are connected with seams 52 at midsections thereof in a direction that the airbag deploys.

In this embodiment, the airbag 10 is formed by stitching panels 18, 20, 22, 24, 26, 28 and the pair of connecting belts 70 together. A construction of stitching between the panels will be described in detail next. As shown in FIG. 4(*a*), the panel 18 (rear inner panel) constitutes a center surface of the communicating portion 16 and rear end surfaces of the right half airbag 12 and the left half airbag 14 from the midsections thereof in the direction of deployment. The panel 20 (rear outer panel) constitutes a surface opposite to the rear inner panel 18 (outer surface of the airbag).

The panels 22, 24 (front inner panels) constitute front center surfaces of the right half airbag 12 and the left half airbag 14 from the midsections in the direction of deployment (opposing surfaces of the right half airbag 12 and the left half airbag 14). The panels 26, 28 (front outer panels) constitute surfaces opposite to the front inner panels 22, 24 (outer surfaces of the airbag). In other words, the front inner panels 22, 24 and the front outer panels 26, 28 constitute both side surfaces of the right half airbag 12 and the left half airbag 14, respectively.

As described above, the connecting belts 70 connect the front inner panel 22 and the front outer panel 26 of the right half airbag 12, and the front inner panel 24 and the front outer panel 28 of the left half airbag 14, respectively. Seams 30 (sewing thread) join the rear inner panel 18 and the rear outer panel 20, and seams 32, 34 join the rear inner panel 18 and the front inner panels 22, 24, respectively. Seams 36, 38 join the rear outer panel 20 and the front outer panels 26, 28, and seams 72 join the both ends of the connecting belts 70, the front inner panels 22, 24, and the front outer panels 26, 28. A vent hole 28*a* is provided in the front outer panel of the left half airbag. A similar vent hole (not shown) is provided in the front outer panel 26 of the right half airbag.

As shown in FIG. 1(*a*), seam allowances (joint allowances) 44, 46 are disposed between the rear inner panel 18 and the front inner panels 22, 24, and are exposed on the outer surfaces of the right half airbag 12 and the left half airbag 14. As shown in FIG. 1(*b*) and FIG. 3, tongue-shaped joint allowances 48, 50 (only the joint allowance 48 is shown in FIG. 3) extend from the seam allowances 44, 46. As shown in FIG. 1(*b*), the seams 52 stitch the joint allowances 48, 50 together.

With this arrangement, the right half airbag 12 and the left half airbag 14 are connected with each other at the midsections in the direction of deployment at the seam allowances 44, 46 disposed between the rear inner panel 18 and the front inner panels 22, 24. A distance between a rear end 10*e* of the deployed airbag and the seams 52 is preferably 30 to 70%, more preferably 40 to 55%, of a length L of the deployed airbag 10 in the front-to-rear direction.

The rear outer panel 20 constituting the outer surface of the communicating portion 16 is provided with a pair of slits 54 for inserting the inflator. In this embodiment, as shown in FIGS. 1(*a*) and 1(*b*), a rod-shaped inflator 56 is employed. The inflator 56 is inserted into the slits 54 so as to pass through the communicating portion 16 in the width direction of the vehicle, and both ends of the inflator 56 are disposed outside the airbag 10.

The airbag 10 is mounted to an airbag apparatus for protecting the occupant in case of vehicle collision. The airbag apparatus includes a case (not shown) in a box shape with no lid for storing the airbag 10, and the airbag 10 is connected to the case. As shown in FIG. 1(*b*), holes 58 are formed in the airbag for inserting a fastener (not shown) such as bolt for connecting the airbag 10 to the case. The inflator 56 is attached to the interior of the case at both ends thereof.

The airbag apparatus is constructed such that the airbag 10 is folded and stored in the case, and a cover (not shown) such as a lid is attached to the case so as to cover the folded airbag 10. The airbag 10 presses and breaks the lid when the airbag is deployed.

The airbag apparatus is mounted in, for example, an instrument panel in front of a front seat of the motor vehicle. In case of vehicle collision, the inflator 56 is activated and ejects gas, so that the gas is ejected from the inflator 56 into the communicating portion 16. The gas from the inflator 56 flows from the communicating portion 16 into the right half airbag 12 and the left half airbag 14, and deploys the right half airbag 12 and the left half airbag 14 on the right front side and the left front side of the occupant, respectively.

In the airbag 10, the lateral widths of the right half airbag 12 and the left half airbag 14 are constrained by the connecting belts 70, respectively, when the airbag is deployed. Accordingly, the right half airbag 12 and the left half airbag 14 have relatively small capacities. Therefore, even when the inflator 56 has a relatively small capacity, the right half airbag 12 and the left half airbag 14 are deployed sufficiently quickly.

In this embodiment, the right and left side surfaces of the right half airbag 12 and the left half airbag 14 move away from each other by the length of the connecting belts 70, respectively. Accordingly, the right half airbag 12 and the left half airbag 14 have certain thicknesses even at the portions where the side surfaces are connected by the connecting belts 70.

In the airbag 10, when the right half airbag 12 and the left half airbag 14 are deployed from the folded state, even if one of the airbags 12, 14 is deployed faster and the other of the airbags 12, 14 is deployed slower, the one of the airbags pulls the other of the airbags to facilitate the deployment, as the right half airbag 12 and the left half airbag 14 are connected. In addition, the right half airbag 12 and the left half airbag 14 are connected with each other at the midsections thereof in the direction of deployment by the seams 52. Therefore, the one of the airbags starts to pull the other of the airbags in the direction of deployment from a relatively early stage once the deployment starts. Accordingly, both of the right half airbag 12 and the left half airbag 14 are deployed smoothly and substantially symmetrically from the early stage of deployment. When the airbag 10 is completely deployed, the space 13 is formed between the distal ends of the right half airbag 12 and the left half airbag 14, and the space 13 faces the occupant. The right half airbag 12 receives the right thorax of the occupant, the left half airbag 14 receives the left thorax, and the space 13 faces the portion around the breastbones. Therefore, a reaction force exerted on the portion around the breastbones is reduced when the airbag receives the occupant.

The airbag 10 is manufactured in the following procedure. As shown in FIG. 4(a), the rear inner panel 18 and the front inner panels 22, 24 are stitched together by the seams 32, 34, and the rear outer panel 20 and the front outer panels 26, 28 are stitched together by the seams 36, 38. In this case, the seam allowances 44, 46 between the rear inner panel 18 and the front inner panels 22, 24 are disposed on the side exposed to the outside of the airbag in the finished state as an airbag product. In this embodiment, as shown in FIG. 4(b), at the seam allowance 44 of the rear inner panel 18 and the front inner panel 22, the rear inner panel 18 and the front inner panel 22 are stitched by the seams 32 (32a, 32b) only at both ends of the seam allowance 44, respectively. An opening 60 for reversing the airbag is formed between the seams 32a, 32b.

In the finished state as an airbag product, a stitched body of the rear inner panel 18 and the front inner panels 22, 24 and a stitched body of the rear outer panel 20 and the front outer panels 26, 28 are superimposed and stitched together by the seams 30, 40, 42 around peripheral edges thereof. The both ends of the connecting cords 70 are stitched to the inner peripheral surfaces (surface facing the inside of the airbag in the finished state as an airbag product) of the front inner panels 22, 24 and the front outer panels 26, 28, which are disposed outside in this state, respectively.

Accordingly, a reversed intermediate airbag product is manufactured. Then, the intermediate airbag product is reversed through the opening 60 formed at the seam allowance 44. The airbag 10 is completed by stitching the joint allowances 48, 50 of the seam allowances 44, 46 together by the seams 52. When the joint allowances 48, 50 are stitched together, the opening 60 is closed by the seams 52.

As described above, the airbag 10 is formed of a plurality of the panels. Thus, although the outer surface of the airbag 10 has a large area and a complex shape, the airbag may be manufactured from the panels having relatively small area without wasting a material.

In this embodiment, the left half airbag 12 and the right half airbag 14 are joined at the seam allowances 44, 46 of the rear inner panel 18 and the front inner panels 22, 24. Accordingly, it is not necessary to use a tie panel for connecting the right half airbag 12 and the left half airbag 14 in addition to the respective panels 18, 22, 24, thereby reducing a cost for constructing the airbag 10.

In this embodiment, the pair of the slits 54 is provided in the rear outer panel 20 of the communicating portion 16 as openings for an inflator, and the rod-shaped inflator 56 is inserted into the slits 54 so that the inflator 56 is disposed in the communicating portion 16. When the openings are formed into a slit-shape, the connecting strength of the inflator 56 to the airbag 10 is high.

In this embodiment, the opening 60 is formed in the seam allowance 44 for reversing the airbag product in the process of manufacturing the airbag as described above. Thus, even when the intermediate airbag product can not be reversed easily via the vent hole or the opening for an inflator, in particular, even when the openings for an inflator are formed in a slit-shape as in this embodiment, the intermediate airbag product can be reversed easily via the opening 60. The opening 60 is closed with the seams 52 when the joint allowances 48, 50 are stitched together. Thus, the gas introduced from the inflator 56 into the right half airbag 12 and the left half airbag 14 does not leak through the opening 60.

In the embodiment, the both side surfaces of the right half airbag 12 and the left half airbag 14 are connected with each other by the connecting cords 70. Alternatively, the side surfaces may be connected by two or more connecting belts. It is also possible to connect upper and lower surfaces of the right half airbag 12 and the left half airbag 14 by connecting belts to constrain vertical lengths of the right half airbag 12 and the left half airbag 14 when the airbag is deployed. In this case, the capacities of the right half airbag 12 and the left half airbag 14 are reduced, and thus even when an inflator has a small capacity, the right half airbag 12 and the left half airbag 14 can be deployed sufficiently quickly.

In addition to the lateral direction and the vertical direction, it is further possible to connect the surfaces of the right half airbag 12 and the left half airbag 14 opposing obliquely when viewed from the occupant with connecting belts so that the lengths of the right half airbag 12 and the left half airbag 14 in the oblique direction are constrained.

Figure 5:
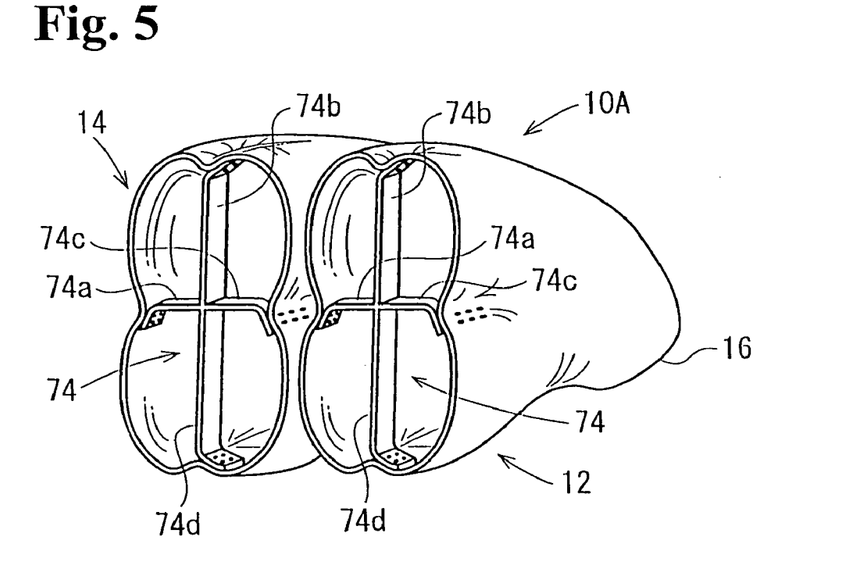
FIG. 5 is a cross sectional perspective view of an airbag according to another embodiment.

According to another embodiment of the present invention, an airbag 10A includes the connecting belts for constraining both the lateral widths and the vertical widths of the left half airbag and the right half airbag. FIG. 5 is a cross-sectional perspective view of the airbag 10A having a portion where connecting belts are provided. The airbag 10A also includes the right half airbag 12 to be deployed on the right front side of the occupant, the left half airbag 14 to be deployed on the left front side of the occupant, and the communicating portion 16 communicating the end portions of the right half airbag 12 and the left half airbag 14 with each other. Connecting cords 74 as constraining means are provided in the right half airbag 12 and the left half airbag 14 for constraining the lateral widths and the vertical widths of the right half airbag 12 and the left half airbag 14, respectively.

Each of the connecting cords 74 includes four arm portions 74a, 74b, 74c, 74d extending in four directions. As shown in FIG. 5, the arm portions 74a, 74c extend laterally inside the right half airbag 12 and the left half airbag 14, and distal ends thereof are stitched to the right and left side surfaces of the right half airbag 12 and the left half airbag 14, respectively. The arm portions 74b, 74d extend vertically inside the right half airbag 12 and the left half airbag 14, and distal ends thereof are stitched on the upper surfaces and the lower surfaces of the right half airbag 12 and the left half airbag 14.

In the airbag 10A, when the right half airbag 12 and the left half airbag 14 are deployed, the arm portions 74a, 74c constrain the both side surfaces of the right half airbag 12 and the left half airbag 14 in a direction away from each other. Likewise, the arm portions 74b, 74d constrain the upper surfaces and the lower surfaces of the right half airbag 12 and the left half airbag 14 in a direction away from each other. Accordingly, both of the lateral widths and the vertical widths of the right half airbag 12 and the left half airbag 14 are constrained.

In FIG. 5, the both side surfaces of the right half airbag 12 and the left half airbag 14 are connected with each other by the substantially horizontal arm portions 74a, 74c of the connecting cords 74. The upper surfaces and the lower surfaces thereof are connected by the substantially vertical arm portions 74b, 74d. It is also possible to constrain the vertical and lateral widths of the right half airbag 12 and the left half airbag 14 by connecting the upper right surfaces and the lower left surfaces of the right half airbag 12 and the left half airbag 14 by the arm portions 74a, 74c, and by connecting the upper left surfaces and the lower right surfaces thereof by the arm portions 74b, 74d.

Figure 6:
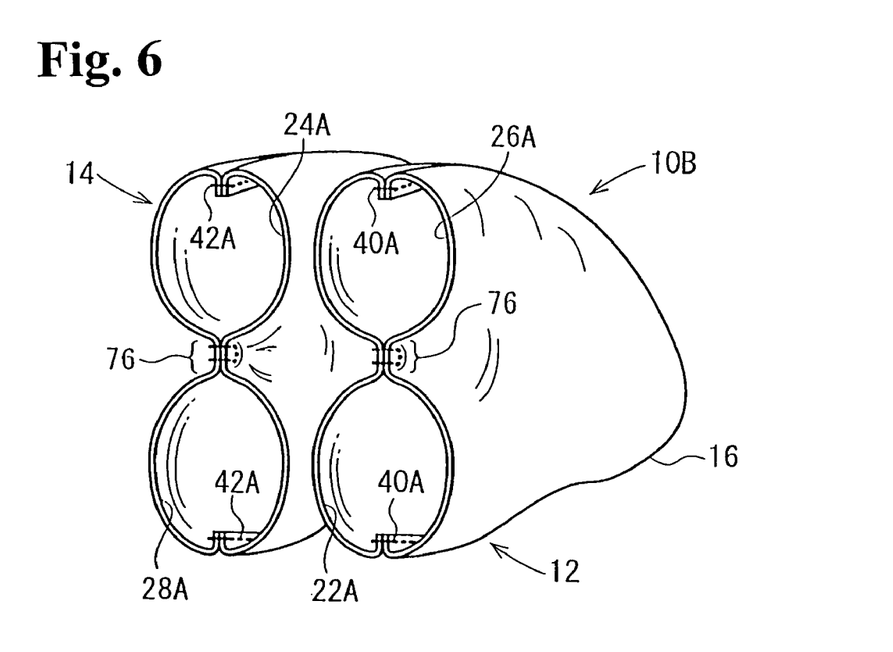
FIG. 6 is a cross-sectional perspective view of an airbag according to a further embodiment.

In the embodiment described above, the connecting cords are used as means for constraining the widths of the left half airbag and the right half airbag. Alternatively, it is possible to constrain the widths of the left half airbag and the right half airbag by joining the panels constituting the left and the right side surfaces of the left half airbag and the right half airbag directly with each other. FIG. 6 is a cross sectional perspective view of an airbag in which panels are joined directly with each other.

As shown in FIG. 6, an airbag 10B includes the right half airbag 12 to be deployed on the right front side of the occupant, the left half airbag 14 to be deployed on the left front side of the occupant, and the communicating portion 16 communicating the end portions of the right half airbag 12 and the left half airbag 14 with each other. Left and right side surfaces of the right half airbag 12 are formed of an inner panel 24A and an outer panel 28A. Left and right side surfaces of the left half airbag 14 are formed of an inner panel 22A and an outer panel 26A. The panel 22A and the panel 26A are superimposed, and the panel 24A and the panel 28A are superimposed. Peripheral edges thereof are stitched with each other by seams 40A, 42A to form a bag-shape. As shown in FIG. 6, center portions of the inner panels 22A, 24A and the outer panels 26A, 28A are stitched directly with each other by seams 76. Accordingly, the portions stitched by the seams 76 prevent the inner panels 22A, 24A and the outer panels 26A, 28A from moving in the direction away from each other, so that the lateral widths of the right half airbag 12 and the left half airbag 14 are constrained.

In this embodiment, the portions stitched by the seams 76 have an annular shape, and are not connected to the seams 40A, 42A around the peripheral edges of the inner panels 22A, 24A and the outer panels 26A, 28A.

In the airbag 10B, the panels 22A, 26A and the panels 24A, 28A constituting the both side surfaces of the right half airbag 12 and the left half airbag 14 are stitched directly with each other by the seams 76, respectively. Accordingly, the portions of the panels 22A, 26A, and the panels 24A, 28A stitched by the seams 76 do not move away from each other. Therefore, the capacities of the right half airbag 12 and the left half airbag 14 when deployed are sufficiently reduced. Even when an inflator has a small capacity, the right half airbag 12 and the left half airbag 14 can be deployed very quickly.

The features of the portions stitched by the seams 76, such as configuration, number, arrangement, or the like, are not limited to those shown in the drawings, and may be modified as needed.

Figure 7A:
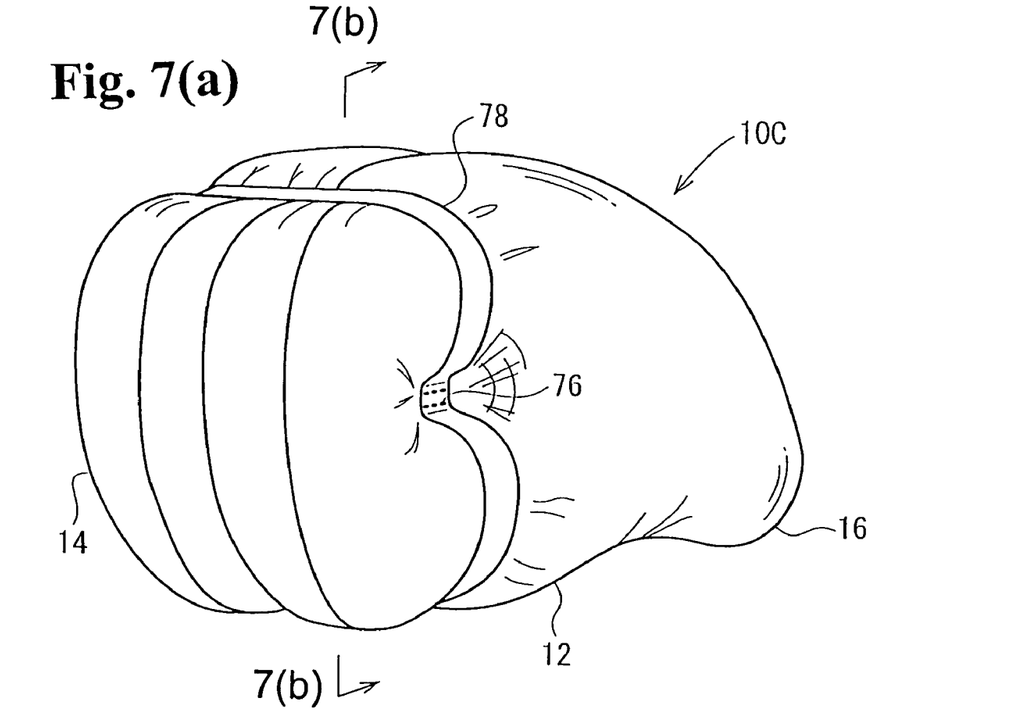
FIG. 7(a) is a perspective view of the airbag tightened by a belt.

According to a further embodiment of the present invention, the left half airbag and the right half airbag may have narrow portions tighten with a belt or the like wrapping around an outer periphery of the left half airbag and the right half airbag, so that the capacities of the left half airbag and the right half airbag are reduced when the airbag is deployed. FIG. 7(a) is a perspective view of the airbag in a state of being tightened by a belt, and FIG. 7(b) is a cross sectional perspective view of a portion at which the belt is provided.

Figure 7B:
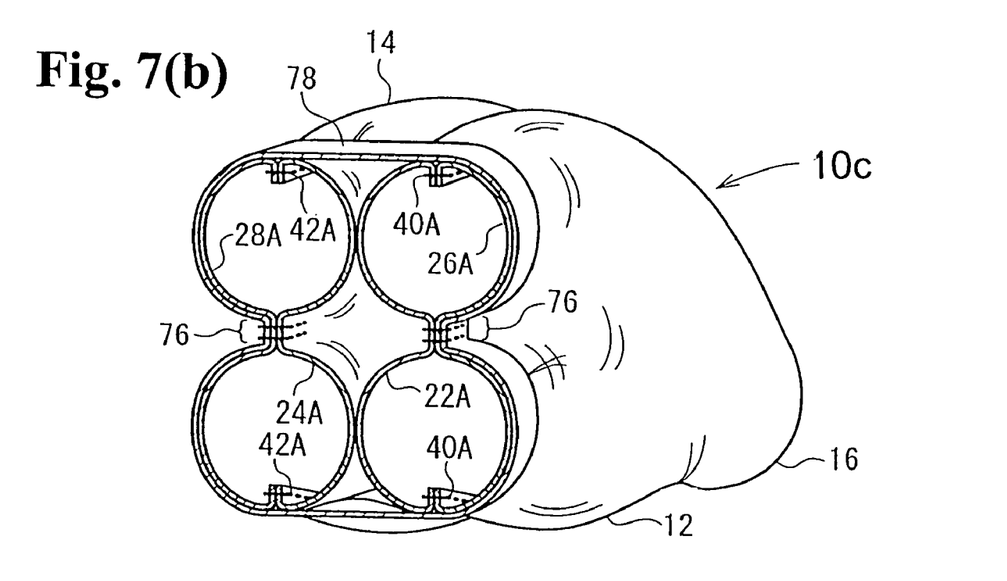
FIG. 7(b) is a cross-sectional perspective view of a portion at which the belt is provided.

As shown in FIGS. 7(a) and 7(b), an airbag 10C includes the right half airbag 12 to be deployed on the right front side of the occupant, the left half airbag 14 to be deployed on the left front side of the occupant, and the communicating portion 16 communicating the end portions of the right half airbag 12 and the left half airbag 14 with each other. The both side surfaces of the right half airbag 12 are formed of the inner panel 24A and the outer panel 28A. The both side surfaces of the left half airbag 14 are formed of the inner panel 22A and the outer panel 26A. The inner panels 22A, 24A and the outer panels 26A, 28A are superimposed, and the peripheral edges thereof are stitched with each other by the seams 40A, 42A to form a bag-shape.

The center portions of the panel 22A and the panel 26A are stitched by the seams 76 with each other, and the center portions of the panel 24A and the panel 28A are stitched by the seams 76 with each other. The lateral widths of the right half airbag 12 and the left half airbag 14 are constrained by stitching of the seams 76 when the airbag is inflated.

In this embodiment, a tightening belt 78 extends around the outer periphery of the right half airbag 12 and the left half airbag 14, so that the center portions of the right half airbag 12 and the left half airbag 14 are constrained when the airbag is inflated. As shown in FIG. 7(a), the tightening belt 78 is laminated in three layers at the seams 76 relative to the outer panels 26A, 28A and the inner panels 22A, 24A, and is stitched by the seams 76, so that the tightening belt 78 is attached to the airbag 10C.

In the airbag 10C, the capacities of the right half airbag 12 and the left half airbag 14 are small when the airbag is inflated. Thus, it is possible to deploy the airbag sufficiently quickly even when an inflator has a small capacity. In the embodiments described above, the both side surfaces of the left half airbag and the right half airbag are connected or joined with each other, so that the capacities of the left half airbag and the right half airbag are reduced when the airbag is deployed.

Figure 8A:
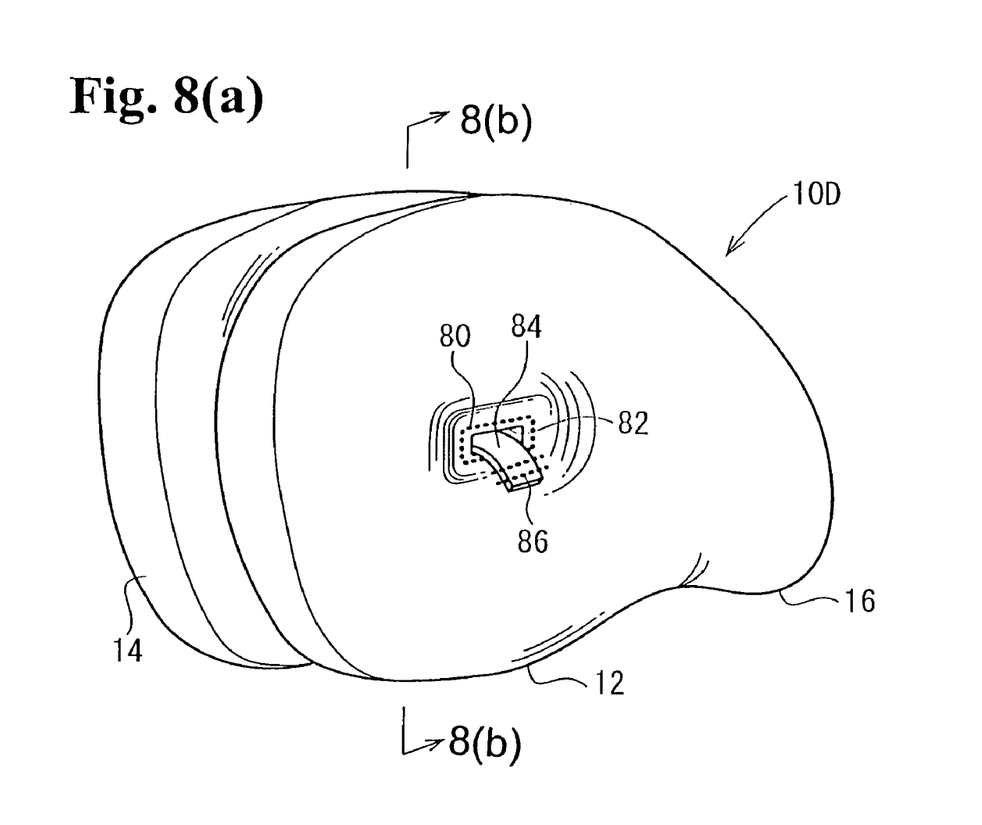
FIG. 8(a) is a perspective view of the airbag.

According to a still further embodiment of the present invention, outer side surfaces of the left half airbag and the right half airbag are joined with each other to constrain their movements in the direction away from each other, so that the capacities of the left half airbag and the right half airbag are reduced when the airbag is deployed. FIG. 8(a) is a perspective view of an airbag having such an arrangement, and FIG. 8(b) is a cross sectional view (rear view) taken along line 8(b)—8(b) in FIG. 8(a).

Figure 8B:
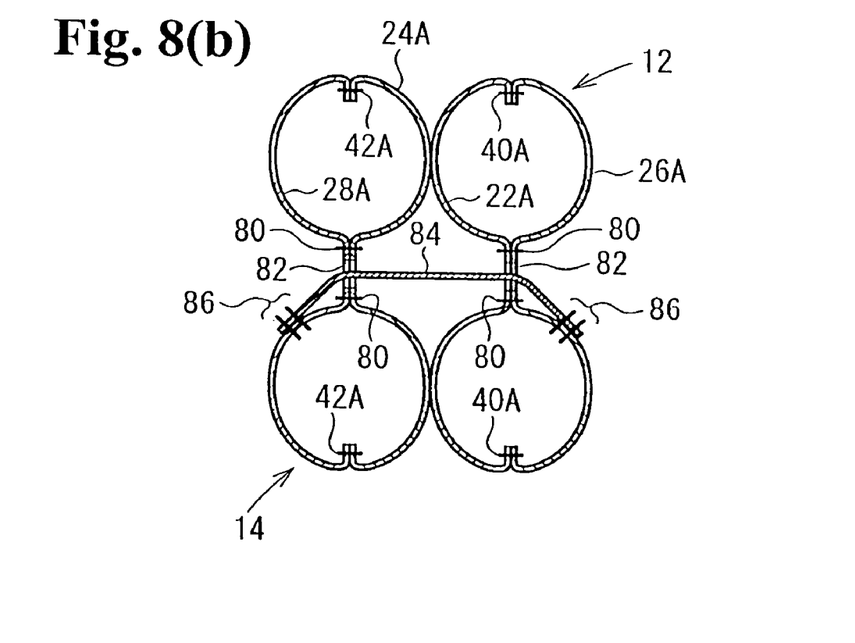
FIG. 8(b) is a cross sectional view of the airbag taken along line 8(b)—8(b) in FIG. 8(a)

As shown in FIGS. 8(a) and 8(b), an airbag 10D includes the right half airbag 12 to be deployed on the right front side of the occupant, the left half airbag 14 to be deployed on the left front side of the occupant, and the communicating portion 16 communicating the end portions of the right half airbag 12 and the left half airbag 14 with each other. The both side surfaces of the right half airbag 12 are formed of the inner panel 24A and the outer panel 28A. The both side surfaces of the left half airbag 14 are formed of the inner panel 22A and the outer panel 26A. The panel 22A and the panel 26A are superimposed, and the panel 24A and the panel 28A are superimposed. The peripheral edges thereof are stitched with each other by the seams 40A, 42A to form a bag-shape. The center portions of the panel 22A, 26A, and the center portions of the panels 24A, 28A are stitched by seams 80 with each other to constrain the lateral widths of the right half and the left half airbags 12, 14 when the airbag is deployed.

In this embodiment, the portion stitched by the seam 80 has substantially a square loop. The right half airbag 12 and the left half airbag 14 have belt insertion holes 82 passing through the inner panels 22A, 24A and the outer panels 26A, 28A at an inside of the square loop. As shown in FIG. 8(b), a connecting belt 84 passes through the belt insertion holes 82 so as to pass through both of the right half airbag 12 and the left half airbag 14. Both ends of the connecting belt 84 are joined to the outer surfaces of the outer panel 28A of the right half airbag 12 and the outer panel 26A of the left half airbag 14, and stitched to the panels 26A, 28A by seams 86, respectively.

In the airbag 10D, the panels 22A, 26A are directly stitched with each other, and the panels 24A, 28A are directly stitched with each other by the seams 80. Accordingly, the portions stitched by the seams 80 do not move away from each other. Also, the outer panel 28A of the right half airbag 12 is connected to the outer panel 26A of the left half airbag 14 by the connecting belt 84. Accordingly, the panels do not move away from each other more than a length of the connecting belts 84. Therefore, the capacities of the right half airbag 12 and the left half airbag 14 are significantly reduced when the airbag is deployed.

Figure 9A:
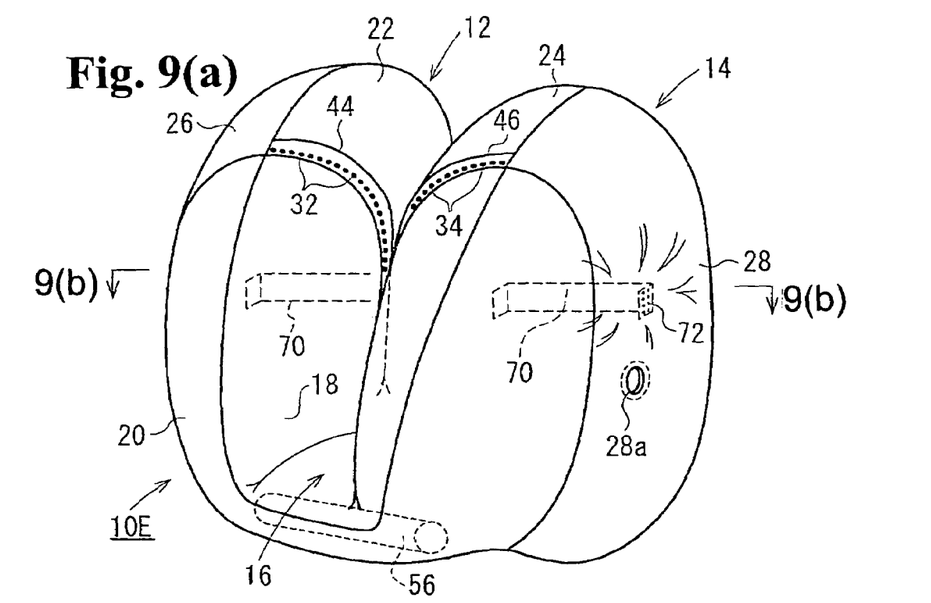
FIG. 9(a) is a perspective view of the airbag.
Figure 9B:
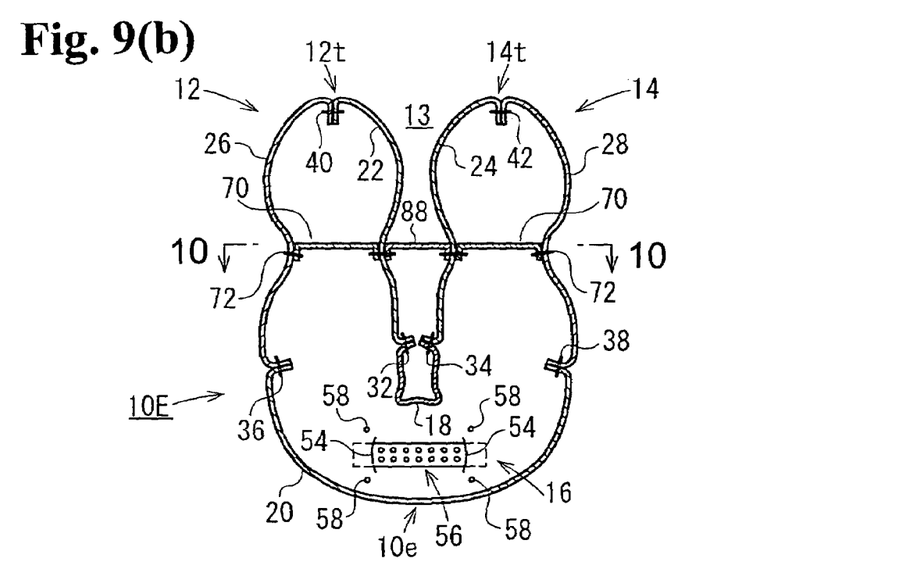
FIG. 9(b) is a cross sectional view of the airbag taken along line 9(b)—9(b) in FIG. 9(a)
Figure 10:
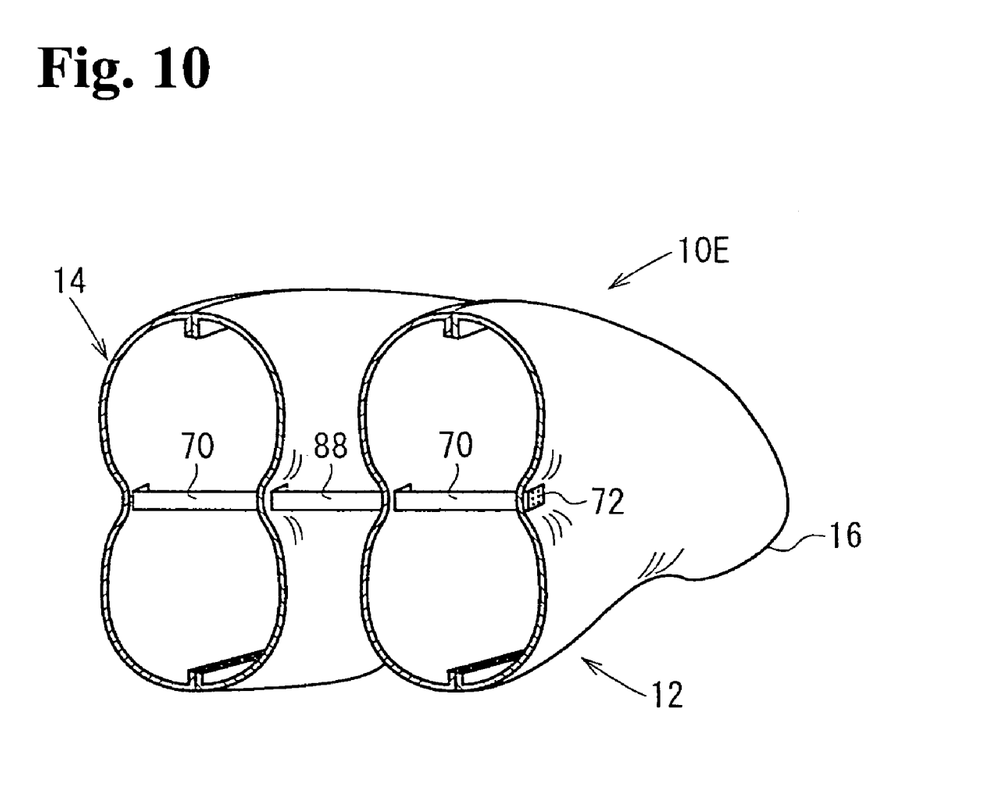
FIG. 10 is a sectional view of the airbag taken along line 10—10 in FIG. 9.

FIGS. 9(a) and 9(b) are views of an airbag according to a still further embodiment, wherein FIG. 9(a) is a perspective view of the airbag, and FIG. 9(b) is a cross sectional view of the airbag taken along line 9(b)—9(b) in FIG. 9(a). FIG. 10 is a sectional view of the airbag taken along line 10—10 in FIG. 9. In an airbag 10E, the right half airbag 12 and the left half airbag 14 are connected at facing portions with a connecting belt 88 as a connecting member.

In this embodiment, when the airbag 10E is inflated, the connecting belt 88 is linearly aligned with the connecting cords 70 in the respective half airbags 12, 14. Accordingly, the shapes of the half airbags 12, 14 in the inflated state do not distorted, and the half airbags 12, 14 are inflated in designed shapes.

In this embodiment, the tongue-shaped joint allowances 48, 50 shown in FIG. 1(b) and FIG. 3 are omitted, and the respective half airbags 12, 14 are not connected at the vicinity of the seams 32, 34. The other features of the airbag 10E are the same as those of the airbag 10 shown in FIGS. 1(a), 1(b) to 3, and the same reference numeral denotes the same component.

The passenger airbag with the airbag 10E is mounted on the upper surface of the instrumental panel. In this case, when the airbag 10E is fully inflated (before contacting a passenger), the connecting belt 80 is preferably disposed at a position horizontally away from the rear end of the instrumental panel (rearmost end in the front-to-rear direction of the vehicle) by 200 to 300 mm. Regarding a horizontal position or height, when the airbag is fully inflated, the connecting belt 80 is preferably disposed at a position away from a seating surface of the passenger seat by less than 500 mm, for example, 400 mm to 500 mm.

In the embodiment as shown in FIGS. 9(a), 9(b) and 10, the surfaces of the belt 88 and the cords 70 face vertically. With this structure, as compared to the structure such that the surfaces of the belt 88 and the cords 70 face laterally, applied forces formed at sewing portions among the respective half airbags 12, 14, the belt 88 and the cords 70 at the initial expansion of the airbags become small.

The connecting belt 88 and the connecting cords 70 preferably have a vertical width of 100 mm to 140 mm, for example, 120 mm. When the connecting belt 88 and the connecting cords 70 are attached to the respective half airbags 12, 14, preferably, the upper most seam is away from the lower most seam by about 90 mm.

Figure 11:
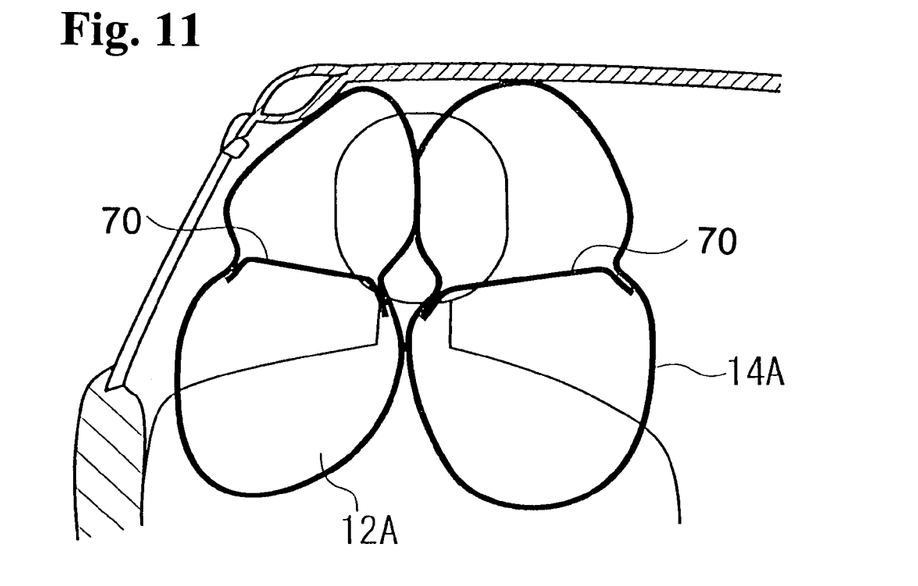
FIG. 11 is an explanatory view showing an airbag according to a still further embodiment.

According to a still further embodiment of the present invention, as shown in FIG. 11, the airbag at a side of an A pillar (a right half airbag 12A in FIG. 11) may include an inclined upper portion along a cabin to avoid contact with the A pillar, a windshield, or a side window as much as possible. Numeral 70 shows connecting cords as explained before.

Figure 12:
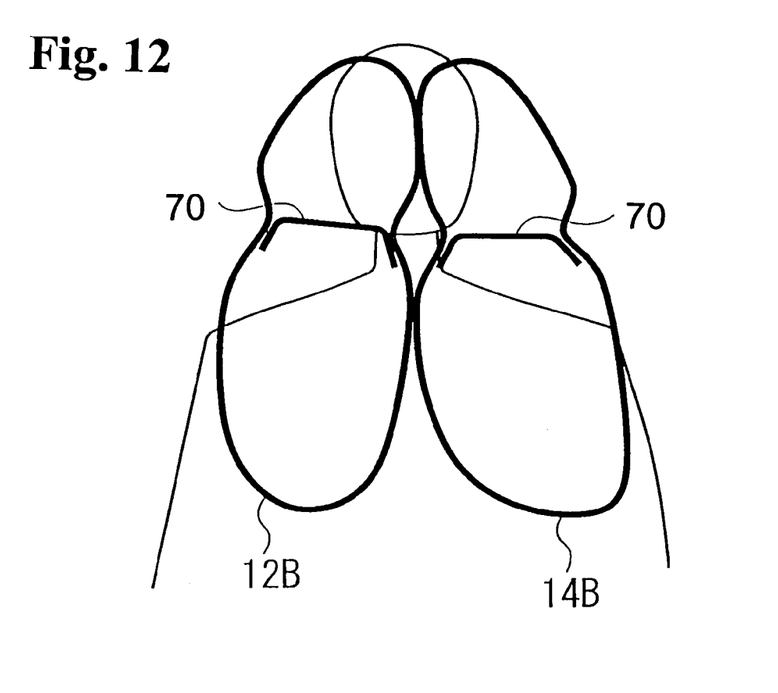
FIG. 12 is an explanatory view showing an airbag according to a still further embodiment.

According to a still further embodiment of the present invention, as shown in FIG. 12, the airbag may be formed to have an inflated state so that the lateral width decreases gradually upwardly. As shown in FIG. 12, the both side surfaces of the right half airbag 12B and the left half airbag 14B are connected with each other by connecting cords 70, respectively, so that the widths of the right half airbag 12B and the left half airbag 14B are constrained when the airbag is deployed.

The embodiments described above are just examples of the present invention, and the present invention is not limited to the embodiments shown in the drawings. For example, the right half airbag 12 and the left half airbag 14 are communicated at the base side thereof in the embodiments. Alternatively, both of the bags may be formed separately. The left half airbag and the right half airbag may be deployed by separate inflators. The midsections of the left half airbag and the right half airbag may be connected with each other by a panel, a string, or a net.

In the present invention, the left half airbag and the right half airbag may be formed either in a symmetrical shape or in an asymmetrical shape. The capacities of the left half airbag and the right half airbag may be either the same or different.

While the invention has been explained with reference to the specific embodiments of the invention, the explanation is illustrative and the invention is limited only by the appended claims.

What is claimed is:

1. An airbag for protecting an occupant, comprising:
   a left half airbag to be deployed toward the occupant on a left side of the occupant,
   a right half airbag to be deployed toward the occupant on a right side of the occupant and connected to the left half airbag at midsections in a direction that the left half airbag and the right half airbag deploy, and
   a width constraining device attached to the left half airbag and right half airbag, respectively, for constraining lateral widths thereof expanding in a lateral width direction substantially perpendicular to the direction that the left and right half airbags deploy when the left half airbag and the right half airbag are inflated.

2. An airbag according to claim 1, wherein said width constraining devise extends in the lateral width direction of the airbag.

3. An airbag according to claim 1, wherein said width constraining device includes a joining member for joining panels for constituting each of the left half airbag and the right half airbag.

4. An airbag according to claim 1, wherein said left half airbag and right half airbag have distal ends facing the occupant, said distal ends being separated from each other so that a space is formed between the distal ends facing the occupant when the left half airbag and the right half airbag are inflated.

5. An airbag according to claim 1, further comprising a connecting member for connecting outer portions of the left half airbag and the right half airbag facing each other, said connecting member being formed separately from the width constraining device and extending in a connecting direction of the left half airbag and the right half airbag.

6. An airbag according to claim 5, wherein said width constraining device extends in the lateral width direction of the airbag, and said width constraining device and said connecting member are aligned linearly when the airbag is inflated.

7. An airbag according to claim 1, further comprising vertical width constraining devices for constraining vertical widths of the left half airbag and the right half airbag when the left half airbag and the right half airbag are deployed.

8. An airbag according to claim 1, wherein at least one of said left half airbag and said right half airbag includes an inclined upper portion so that the one of the left half airbag and the right half airbag does not contact an interior of a vehicle when the left half airbag and the right half airbag are inflated.

9. An airbag according to claim 1, wherein at least one of said left half airbag and said right half airbag includes a portion having a thickness gradually decreasing upwardly when the left half airbag and the right half airbag are inflated.

10. An airbag according to claim 1, wherein said left half airbag and said right half airbag have distal ends thereof separated by a distance of 150–350 mm when the left half airbag and the right half airbag are deployed.

11. An airbag according to claim 1, further comprising a base communicating with the left and right half airbags, said left and right half airbags separately projecting outwardly from the base.

12. An airbag apparatus comprising the airbag according to claim 1 and an inflator for inflating the airbag.

13. An airbag according to claim 1, wherein each of said left half airbag and said right half airbag has panel portions facing each other in said lateral width direction, said width constraining device connecting said panel portions of each of said left half airbag and said right half airbag.

* * * * *